United States Patent Office
3,265,666
Patented August 9, 1966

3,265,666
POLYURETHANE RESIN FROM AN ORGANIC ISOCYANATE AND A POLYHYDRIC ALCOHOL ESTERIFIED WITH AN ALKYLATED DIPHENOL
Louise H. Brown, Santa Monica, and Ronald Swidler, Pasadena, Calif., assignors, by mesne assignments, to Armour and Company, Chicago, Ill., a corporation of Delaware
No Drawing. Filed May 22, 1961, Ser. No. 111,497
12 Claims. (Cl. 260—77.5)

This invention relates to polyurethane resin compositions and has particular reference to polyurethane resins useful in the production of films, protective coatings, paints and the like.

A primary object of the present invention is to provide novel polyurethane resin compositions and processes for producing the same.

A further object of the present invention is to provide novel polyurethane resin compositions incorporating novel curing or cross-linking agents.

Still another object of the present invention is to provide novel polyurethane resins comprising diisocyanates cross-linked with polyhydric alcohol esters of alkylated phenols.

Other objects and advantages of this invention it is believed will be readily apparent from the following detailed description of preferred embodiments thereof.

Briefly, this invention comprehends within its scope the discovery that novel and improved polyurethane resins are obtained by utilizing in the preparation thereof of curing or chain extenders comprising polyhydric alcohol esters of an alkylated phenol selected from the group consisting of hydroxyphenyl stearic acid, hydroxyphenylene distearic acid and mixtures thereof. Such alkylated phenols, the corresponding esters and processes for making the same are fully disclosed in our copending application Serial No. 111,482, filed May 22, 1961, entitled "Phenol Alkylation Process and Products." Said application particularly discloses the treatment of phenol, in the presence of an acid-activated clay catalyst, with oleic acid or a derivative thereof. As used herein and in the appended claims, the term "oleic acid derivatives" and similar terms is intended to mean and include oleic acid esters, including esters of monofunctional alcohols such as methyl oleate, esters of polyfunctional alcohols such as ethylene glycol, glycerides such as triolein; and fats and oils containing oleic acid, oleic acid esters or glycerides of oleic acid such as milk fat, butter, palm oil, vegetable butters, lard, soft tallows (greases), cottonseed oil, sunflowerseed oil, safflower oil, peanut oil, corn oil and olive oil.

In carrying out the process of the present invention a polyhydric alcohol such as glycerol, ethylene glycol, pentaerythritol and the like, is esterified with one of the above-mentioned alkylated phenols to produce an ester which contains two or more phenolic hydroxyl groups. Such an ester is then treated with a di- or polyisocyanate to form a polyurethane resin. The process of the present invention also includes the preparation of a resin containing one of the aforesaid alkylated phenols, the resin being used with a di- or polyisocyanate to cast films of improved properties.

Any of the aliphatic, aromatic, alicyclic or heterocyclic diisocyanates or polyisocyanates can be used in preparing the polyurethane resins of the present invention, including toluene diisocyanate; napthalene 1,5-diisocyanate; diphenylmethane 4,4¹-diisocyanate; triphenyl methane triisocyanate; tetramethylene diisocyanate; hexamethylene diisocyanate; mixtures thereof, and the like.

Although not essential, it is preferred to incorporate a catalyst in order to substantially reduce the reaction time of the diisocyanate or polyisocyanate. Such catalysts include the tertiary organic amines such as N,N-di-methyl aniline, trimethyl amine, pyridine, and the like; dibutyl tin diacetate, dibutyl tin dilaurate, and the like.

The following specific examples are illustrative of the compositions and methods of the present invention, but it is to be understood that the invention is not to be limited to the specific details thereof:

*Example 1*

The methyl hydroxyphenyl stearate used in these examples was prepared as follows: methyl oleate (1.5 mole, 445 g.), phenol (3 mole, 282 g.) and Filtrol GR 13 (50 g.) were heated and stirred at 200° C. for one hour. The reaction mixture was cooled and diluted with an equal volume of chloroform. The suspended clay was removed by filtration. The solvent and 106 g. of phenol were removed from the filtrate by distillation leaving a red viscous oil. This oil was dissolved in an equal volume of methanol containing 7 ml. of concentrated sulfuric acid. The resultant solution was diluted with water and the organic layer extracted with ether. The ether extract was submitted to repeated washings with 10% aqueous sodium carbonate, water and saturated aqueous sodium chloride. The ethereal layer was separated and dried over anhydrous potassium carbonate. The drying agent was removed and the ether evaporated leaving a red oil which was submitted to vacuum distillation at 0.9 mm. Listed are boiling points, weight and refractive index at 20°: (1) 45–208°, 48 g.; (2) 218–235°, 275 g., 1.4953 and (3) residue 145 g. Fraction 2 is methyl hydroxyphenylstearate.

6.14 g. (0.067 mole) glycerol was stirred vigorously and refluxed in a 200 ml. xylene for 2 hours under a Dean and Stark trap. Methyl hydroxyphenylstearate (78 g., 0.2 mole) and 1.0 g. sodium methylate were added. Rapid stirring was continued and methanol distilled off at the top of a column. After 3 hours 8 ml. (0.198 mole) methanol had been collected. The mixture turned dark on exposure to air. It was washed with water until the washings were neutral, dried over potassium carbonate, filtered and the solvent evaporated. A dark red oil (68 g.) remained. The molecular weight was determined by boiling point elevation in carbon tetrachloride. Calculated 1211, found 1094. The infrared spectrum was identical to that of methyl hydroxyphenylstearate except for small peaks at 2.5 and 7.1 which were attributed to residual aliphatic hydroxyl groups. The above triglyceride (4.06 g., 0.01 eq OH) was dissolved in 10 ml. xylene. "Mondur" CB75, a polymethane prepolymer containing free toluene diisocyanate, furnished by the Mobay Chemical Company (3.22 g., 0.011 eq NCO), and 5 drops pyridine were added to the xylene solution. For comparison purposes a solution was prepared of 4.00 g. castor oil, 4.20 g. "Mondur" CB75 and 5 drops pyridine in 10 ml. xylene. A few drops of the above solutions were placed on microscope slides. After warming at 35° for 1 hour the polymer from hydroxyphenylstearic acid had formed a clear, non-tacky, slightly yellow film while the castor oil polymer was still tacky.

*Example 2*

To prepare the ethylene glycol diester of hydroxyphenylstearic acid, 3.1 g. (0.05 mole) ethylene glycol, 39 g. (0.1 mole) methyl hydroxyphenylstearate (prepared as in Example 1) and 0.5 g. sodium methylate were stirred vigorously in 150 ml. xylene. Methanol was distilled off at the top of a column. The mixture was stirred and heated for 6 hours, washed with water until the washings were neutral and decolorized by washing with dilute sodium hydrosulfate. The xylene solution was dried over magnesium sulfate, filtered and the solvent evaporated leaving 37.5 g. orange, viscous oil. The molecular weight was determined by boiling point elevation in carbon tetrachloride, calculated 780, found 816. The above glycol ester (5.0 g.), "Mondur" CB75 (4.8 g.) and pyridine (5 drops) were dissolved in 10 ml. benzene. The solution was filtered and degassed under moderate vacuum. A film was cast on a glass plate using a doctor blade. After gentle warming for 1 hour and solvent evaporation a clear, tough, flexible film was obtained.

*Example 3*

The pentaerythritol ester of hydroxyphenylstearic acid was prepared by stirring and heating a mixture of 0.025 mole pentaerythritol, 0.1 mole methyl hydroxyphenylstearate (prepared as in Example 1) and 0.5 g. sodium methylate in 150 ml. xylene. Methanol was removed at the top of a column. After 24 hours heating the mixture was washed with water until the washings were neutral, dried over magnesium sulfate, filtered and the solvent evaporated. A dark red viscous oil weighing 36 g. was obtained. The molcular weight was determined by boiling point elevation in carbon tetrachloride. Calculated 1560, found 1650. A polyurethane was prepared from 5.0 g. of the above ester, 4.8 g. "Mondur" CB75, and 5 drops of pyridine. The ingredients were dissolved in 10 ml. benzene and a film was cast. Upon gentle warming for 1 hour and solvent evaporation, a cloudy, tough, flexible film resulted.

*Example 4*

The hydroxyphenylstearic acid used to synthesize the alkyd resin was prepared from the alkaline hydrolysis of methyl hydroxyphenylstearate obtained in Example 1. Thus, 120 g. of fraction 2, Example 1 was dissolved in aqueous methanol containing 25 g. of sodium hydroxide. The solution was blanketed with nitrogen and allowed to stand 18 hours. The reaction mixture was then diluted with water and acidified with hydrochloric acid. The organic layer which separated was extracted with ether. The ethereal extract was washed with water and saturated aqueous sodium chloride. The ethereal extract was separated and dried over sodium sulfate. The drying agent was removed and the ether evaporated leaving 110 g. of a light brown oil which was dissolved in carbon tetrachloride and treated with aqueous sodium hydrosulfite. The hydroxyphenylstearic acid recovered after this treatment was yellow in color and used directly for the preparation of the resin.

In order to prepare a resin, 47.2 g. hydroxyphenylstearic acid, 34.0 g. phthalic anhydride, 22.2 g. glycerol and 5.0 g. xylene were stirred and heated under nitrogen at 205–11° C. Water (6.8 ml.) was collected in a Dean and Stark trap. The reaction was followed by withdrawing small samples and determining the acid number. After 2 hours heating the acid number had dropped from 135 to 10. Xylene (90 g.) was added to the reaction mixture as it cooled. The material was decolorized by saturation with sulfur dioxide. A film was cast from a solution of 18.8 g. of the resin described above, 8 g. "Mondur" CB75 and 5 drops pyridine. After 6 hours the solution had set to a clear, tough, brittle film.

Having fully described our invention, it is to be understood that we do not wish to be limited to the details set forth, but our invention is of the full scope of the appended claims.

We claim:

1. A polyurethane resin composition comprising the reaction product of an isocyanate selected from the group consisting of organic di- and polyisocyanates, and a chain extender comprising a polyhydric alcohol esterified with an alkylated phenol selected from the group consisting of hydroxyphenylstearic acid, methyl hydroxyphenyl stearate, hydroxyphenylene distearic acid, dimethyl hydroxyphenylene distearate and mixtures thereof, said esterified polyhydric alcohol containing at least two phenolic hydroxyl groups.

2. The composition of claim 1 wherein said alkylated phenol is hydroxyphenylstearic acid.

3. The composition of claim 2 wherein said polyhydric alcohol is glycerol.

4. The composition of claim 2 wherein said polyhydric alcohol is ethylene glycol.

5. The composition of claim 2 wherein said polyhydric alcohol is pentaerythritol.

6. The composition of claim 1 wherein said alkylated phenol is prepared by treating phenol with a material selected from the group consisting of oleic acid and derivatives thereof.

7. The composition of claim 1 wherein said isocyanate is a diisocyanate and wherein said polyhydric alcohol is esterified by reacting glycerol and methyl hydroxyphenylstearate in the presence of a catalyst selected from the group consisting of tertiary amines and dialkyl tin carboxylic acid diesters.

8. The composition of claim 1 wherein said isocyanate is a diisocyanate and wherein said polyhydric alcohol is esterified by reacting ethylene glycol and methyl hydroxyphenylstearate in the presence of a catalyst selected from the group consisting of tertiary amines and dialkyl tin carboxylic acid diesters.

9. The composition of claim 1 wherein said isocyanate is a diisocyanate and wherein said polyhydric alcohol is esterified by reacting pentaerythritol and methyl hydroxyphenylstearate in the presence of a catalyst selected from the group consisting of tertiary amines and dialkyl tin carboxylic acid diesters.

10. A process for the production of a polyurethane resin which comprises admixing an isocyanate selected from the group consisting of organic di- and polyisocyanates, and a chain extender comprising a polyhydric alcohol esterified with an alkylated phenol selected from the group consisting of hydroxyphenylstearic acid, methyl hydroxyphenylstearate, hydroxyphenylene distearic acid, dimethyl hydroxyphenylene distearate and mixtures thereof, said esterified polyhydric alcohol containing at least two phenolic hydroxyl groups.

11. A polyurethane resin composition comprising the reaction product of an isocyanate selected from the group consisting of organic di- and polyisocyanates, and a polyester resin containing an alkylated phenol selected from the group consisting of hydroxyphenylstearic acid, methyl hydroxyphenyl stearate, hydroxyphenylene distearic acid, dimethyl hydroxyphenylene distearate and mixtures thereof.

12. A process for the production of a polyurethane resin which comprises admixing an isocyanate selected from the group consisting of organic di- and polyisocyanates, and a polyester resin containing an alkylated phenol selected from the group consisting of hydroxyphenylstearic acid, methyl hydroxyphenyl stearate, hydroxyphenylene distearic acid, dimethyl hydroxyphenylene distearate and mixtures thereof.

References Cited by the Examiner

UNITED STATES PATENTS

| | | | |
|---|---|---|---|
| 2,246,762 | 6/1941 | Schirm | 260—410.5 |
| 2,634,279 | 4/1950 | Kuhrt | 260—410.7 |
| 2,733,261 | 1/1956 | Seeger | 260—75 |

FOREIGN PATENTS

| | | |
|---|---|---|
| 206,295 | 8/1954 | Australia. |

LEON J. BERCOVITZ, *Primary Examiner.*

HAROLD BURSTEIN, *Examiner.*

M. C. JACOBS, *Assistant Examiner.*